US012284745B2

(12) United States Patent
Honda et al.

(10) Patent No.: US 12,284,745 B2

(45) Date of Patent: Apr. 22, 2025

(54) EXTREME ULTRAVIOLET LIGHT GENERATION METHOD, EXTREME ULTRAVIOLET LIGHT GENERATION APPARATUS, AND ELECTRONIC DEVICE MANUFACTURING METHOD

(71) Applicant: Gigaphoton Inc., Tochigi (JP)

(72) Inventors: Yoshiyuki Honda, Oyama (JP); Hirokazu Hosoda, Oyama (JP); Kouichiro Kouge, Oyama (JP)

(73) Assignee: Gigaphoton Inc., Tochigi (JP)

( * ) Notice: Subject to any disclaimer, the term of this patent is extended or adjusted under 35 U.S.C. 154(b) by 467 days.

(21) Appl. No.: 17/823,049

(22) Filed: Aug. 29, 2022

(65) Prior Publication Data

US 2023/0126340 A1 Apr. 27, 2023

(30) Foreign Application Priority Data

Oct. 25, 2021 (JP) ................................ 2021-174093

(51) Int. Cl.
*H05G 2/00* (2006.01)

(52) U.S. Cl.
CPC ............. *H05G 2/008* (2013.01); *H05G 2/006* (2013.01)

(58) Field of Classification Search
CPC ............................... H05G 2/006; H05G 2/008
See application file for complete search history.

(56) References Cited

U.S. PATENT DOCUMENTS

| | | | |
|---|---|---|---|
| 9,113,540 | B2 | 8/2015 | Hori et al. |
| 10,131,017 | B2 | 11/2018 | Courvoisier et al. |
| 2013/0105712 | A1 | 5/2013 | Yanagida et al. |

FOREIGN PATENT DOCUMENTS

| | | |
|---|---|---|
| JP | 2003-270551 A | 9/2003 |

OTHER PUBLICATIONS

Netherlands Search Report issued by the Netherlands Patent Office on May 3, 2024, which corresponds to NL 2032877 and is related to U.S. Appl. No. 17/823,049. (A partial English language translation is on pp. 8-11.).

Anonymus (Research Disclosure database No. 674033), Research Disclosure, May 5, 2020.

*Primary Examiner* — Nicole M Ippolito
*Assistant Examiner* — Hanway Chang
(74) *Attorney, Agent, or Firm* — Studebaker Brackett PLLC

(57) ABSTRACT

An extreme ultraviolet light generation method includes a target supply step of outputting a droplet target into a chamber, a prepulse laser light irradiation step of irradiating the droplet target with prepulse laser light to generate a diffusion target, and a main pulse laser light irradiation step of irradiating the diffusion target with main pulse laser light to generate extreme ultraviolet light. Here, the main pulse laser light includes first main pulse laser light and second main pulse laser light, and in the main pulse laser light irradiation step, the diffusion target is irradiated with the first main pulse laser light having higher energy density at a central portion than at an outer peripheral portion and the second main pulse laser light having higher energy density at the outer peripheral portion than at the central portion.

20 Claims, 10 Drawing Sheets

EXTREME ULTRAVIOLET LIGHT GENERATION METHOD, EXTREME ULTRAVIOLET LIGHT GENERATION APPARATUS, AND ELECTRONIC DEVICE MANUFACTURING METHOD

CROSS-REFERENCE TO RELATED APPLICATIONS

The present application claims the benefit of Japanese Patent Application No. 2021-174093, filed on Oct. 25, 2021, the entire contents of which are hereby incorporated by reference.

BACKGROUND

1. Technical Field

The present disclosure relates to an extreme ultraviolet light generation method, an extreme ultraviolet light generation apparatus, and an electronic device manufacturing method.

2. Related Art

Recently, miniaturization of a transfer pattern in optical lithography of a semiconductor process has been rapidly proceeding along with miniaturization of the semiconductor process. In the next generation, microfabrication at 10 nm or less will be required. Therefore, it is expected to develop a semiconductor exposure apparatus that combines an apparatus for generating extreme ultraviolet (EUV) light having a wavelength of about 13 nm with a reduced projection reflection optical system.

As the EUV light generation apparatus, a laser produced plasma (LPP) type apparatus using plasma generated by irradiating a target substance with laser light has been developed.

LIST OF DOCUMENTS

Patent Documents

Patent Document 1: Japanese Patent Application Publication No. 2003-270551

Patent Document 2: U.S. Pat. No. 9,113,540

Patent Document 3: U.S. Pat. No. 10,131,017

SUMMARY

An extreme ultraviolet light generation method according to an aspect of the present disclosure includes a target supply step of outputting a droplet target into a chamber, a prepulse laser light irradiation step of irradiating the droplet target with prepulse laser light to generate a diffusion target, and a main pulse laser light irradiation step of irradiating the diffusion target with main pulse laser light to generate extreme ultraviolet light. Here, the main pulse laser light includes first main pulse laser light and second main pulse laser light, and in the main pulse laser light irradiation step, the diffusion target is irradiated with the first main pulse laser light having higher energy density at a central portion than at an outer peripheral portion and the second main pulse laser light having higher energy density at the outer peripheral portion than at the central portion.

An extreme ultraviolet light generation apparatus according to an aspect of the present disclosure includes a target supply unit configured to output a droplet target into a chamber, a prepulse laser light irradiation system configured to irradiate the droplet target with prepulse laser light to generate a diffusion target, and a main pulse laser light irradiation system configured to irradiate the diffusion target with main pulse laser light to generate extreme ultraviolet light. Here, the main pulse laser light includes first main pulse laser light and second main pulse laser light, and the main pulse laser light irradiation system is configured to irradiate the diffusion target with the first main pulse laser light having higher energy density at a central portion than at an outer peripheral portion and the second main pulse laser light having higher energy density at the outer peripheral portion than at the central portion.

An electronic device manufacturing method according to an aspect of the present disclosure includes outputting extreme ultraviolet light generated with an extreme ultraviolet light generation method to an exposure apparatus, and exposing a photosensitive substrate to the extreme ultraviolet light in the exposure apparatus to manufacture an electronic device. Here, the extreme ultraviolet light generation method includes a target supply step of outputting a droplet target into a chamber, a prepulse laser light irradiation step of irradiating the droplet target with prepulse laser light to generate a diffusion target, and a main pulse laser light irradiation step of irradiating the diffusion target with main pulse laser light to generate the extreme ultraviolet light. Further, the main pulse laser light includes first main pulse laser light and second main pulse laser light, and in the main pulse laser light irradiation step, the diffusion target is irradiated with the first main pulse laser light having higher energy density at a central portion than at an outer peripheral portion and the second main pulse laser light having higher energy density at the outer peripheral portion than at the central portion.

An electronic device manufacturing method according to another aspect of the present disclosure includes inspecting a defect of a mask by irradiating the mask with extreme ultraviolet light generated with an extreme ultraviolet light generation method, selecting a mask using a result of the inspection, and exposing and transferring a pattern formed on the selected mask onto a photosensitive substrate. Here, the extreme ultraviolet light generation method includes a target supply step of outputting a droplet target into a chamber, a prepulse laser light irradiation step of irradiating the droplet target with prepulse laser light to generate a diffusion target, and a main pulse laser light irradiation step of irradiating the diffusion target with main pulse laser light to the generate extreme ultraviolet light. Further, the main pulse laser light includes first main pulse laser light and second main pulse laser light, and in the main pulse laser light irradiation step, the diffusion target is irradiated with the first main pulse laser light having higher energy density at a central portion than at an outer peripheral portion and the second main pulse laser light having higher energy density at the outer peripheral portion than at the central portion.

BRIEF DESCRIPTION OF THE DRAWINGS

Embodiments of the present disclosure will be described below merely as examples with reference to the accompanying drawings.

DESCRIPTION OF EMBODIMENTS

Figure 1:
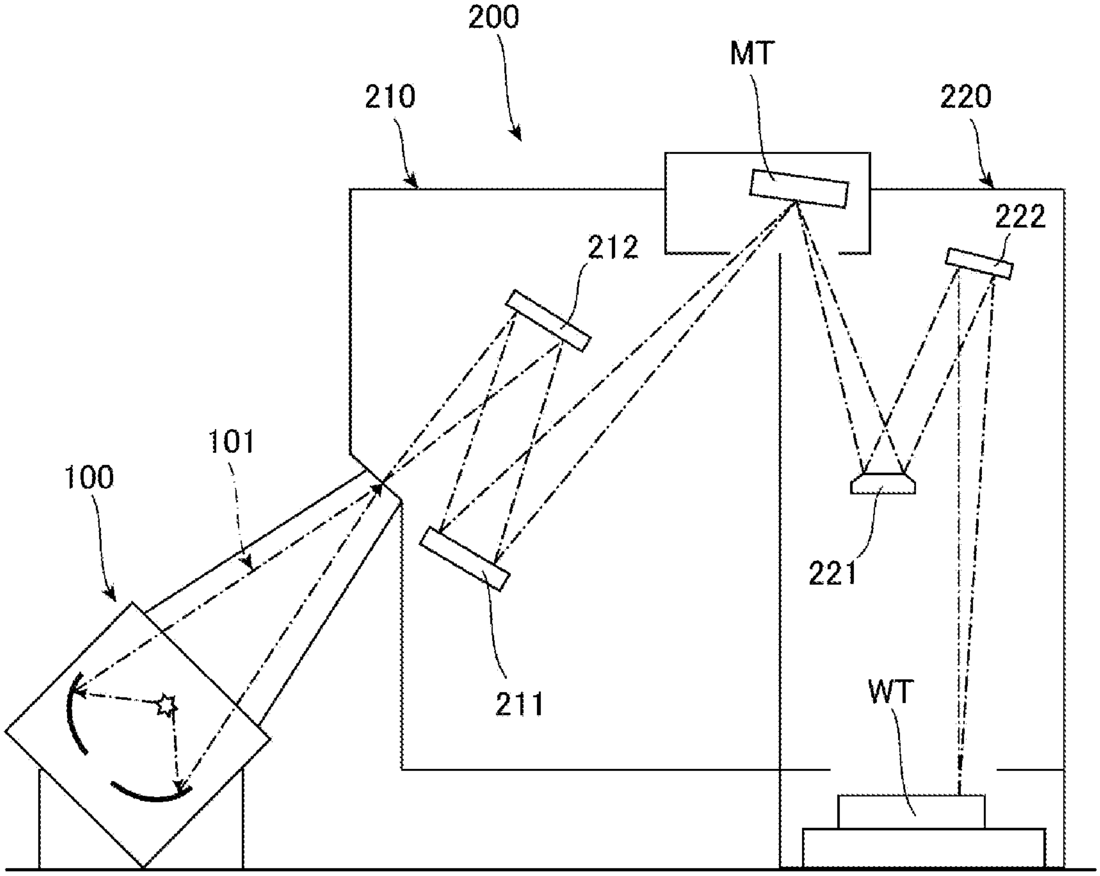
FIG. 1 is a schematic view showing a schematic configuration example of an entire electronic device manufacturing apparatus.

1. Overview
2. Description of electronic device manufacturing apparatus
3. Description of extreme ultraviolet light generation apparatus of comparative example
    - 3.1 Configuration
    - 3.2 Operation
    - 3.3 Problem
4. Description of extreme ultraviolet light generation apparatus of first embodiment
    - 4.1 Configuration
    - 4.2 Operation
    - 4.3 Effects
5. Description of extreme ultraviolet light generation apparatus of second embodiment
    - 5.1 Configuration
    - 5.2 Operation
    - 5.3 Effects Hereinafter, embodiments of the present disclosure will be described in detail with reference to the drawings.

The embodiments described below show some examples of the present disclosure and do not limit the contents of the present disclosure. Also, all configurations and operation described in the embodiments are not necessarily essential as configurations and operation of the present disclosure. Here, the same components are denoted by the same reference numerals, and duplicate description thereof is omitted.

1. Overview

Embodiments of the present disclosure relate to an extreme ultraviolet light generation apparatus generating light having a wavelength of extreme ultraviolet (EUV) and an electronic device manufacturing apparatus. In the following, extreme ultraviolet light is referred to as EUV light in some cases.

2. Description of Electronic Device Manufacturing Apparatus

FIG. 1 is a schematic view showing a schematic configuration example of an entire electronic device manufacturing apparatus. The electronic device manufacturing apparatus shown in FIG. 1 includes an EUV light generation apparatus 100 and an exposure apparatus 200. The exposure apparatus 200 includes a mask irradiation unit 210 including a plurality of mirrors 211, 212 that constitute a reflection optical system, and a workpiece irradiation unit 220 including a plurality of mirrors 221, 222 that constitute a reflection optical system different from the reflection optical system of the mask irradiation unit 210. The mask irradiation unit 210 illuminates, via the mirrors 211, 212, a mask pattern of the mask table MT with EUV light 101 incident from the EUV light generation apparatus 100. The workpiece irradiation unit 220 images the EUV light 101 reflected by the mask table MT onto a workpiece (not shown) arranged on a workpiece table WT via the mirrors 211, 212. The workpiece is a photosensitive substrate such as a semiconductor wafer on which photoresist is applied. The exposure apparatus 200 synchronously translates the mask table MT and the workpiece table WT to expose the workpiece to the EUV light 101 reflecting the mask pattern. Through the exposure process as described above, a device pattern is transferred onto the semiconductor wafer, thereby a semiconductor device can be manufactured.

Figure 2:
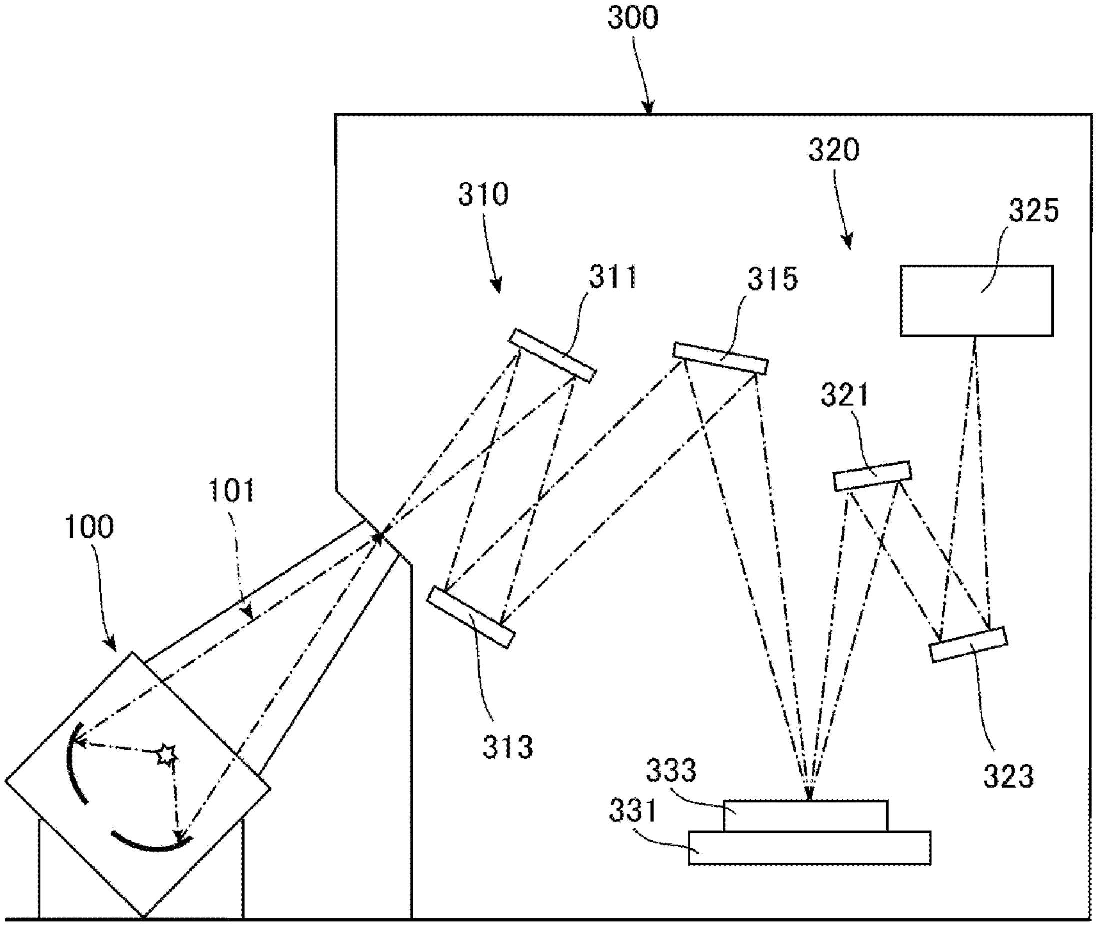
FIG. 2 is a schematic view showing a schematic configuration example of an entire electronic device manufacturing apparatus different from the electronic device manufacturing apparatus shown in FIG. 1.

FIG. 2 is a schematic view showing a schematic configuration example of an entire electronic device manufacturing apparatus different from the electronic device manufacturing apparatus shown in FIG. 1. The electronic device manufacturing apparatus shown in FIG. 2 includes the EUV light generation apparatus 100 and an inspection apparatus 300. The inspection apparatus 300 includes an illumination optical system 310 including a plurality of mirrors 311, 313, 315 that constitute a reflection optical system, and a detection optical system 320 including a plurality of mirrors 321, 322 that constitute a reflection optical system different from the reflection optical system of the illumination optical system 310 and a detector 325. The illumination optical system 310 reflects, with the mirrors 311, 313, 315, the EUV light 101 incident from the EUV light generation apparatus 100 to illuminate a mask 333 placed on a mask stage 331. The mask 333 includes a mask blanks before a pattern is formed. The detection optical system 320 reflects, with the mirrors 321, 323, the EUV light 101 reflecting the pattern from the mask 333 and forms an image on a light receiving surface of the detector 325. The detector 325 having received the EUV light 101 obtains an image of the mask 333. The detector 325 is, for example, a time delay integration (TDI) camera. A defect of the mask 333 is inspected based on the image of the mask 333 obtained by the above-described process, and a mask suitable for manufacturing an electronic device is selected using the inspection result. Then, the electronic device can be manufactured by exposing and transferring the pattern formed on the selected mask onto the photosensitive substrate using the exposure apparatus 200.

3. Description of Extreme Ultraviolet Light Generation Apparatus of Comparative Example

3.1 Configuration

The EUV light generation apparatus 100 of a comparative example will be described. The comparative example of the present disclosure is an example recognized by the applicant as known only by the applicant, and is not a publicly known example admitted by the applicant. Further, the following description will be given with reference to the EUV light generation apparatus 100 that outputs the EUV light 101 to the exposure apparatus 200 as an external apparatus as shown in FIG. 1. Here, the EUV light generation apparatus 100 that outputs the EUV light 101 to the inspection apparatus 300 as an external apparatus as shown in FIG. 2 can obtain the same operation and effect.

Figure 3:
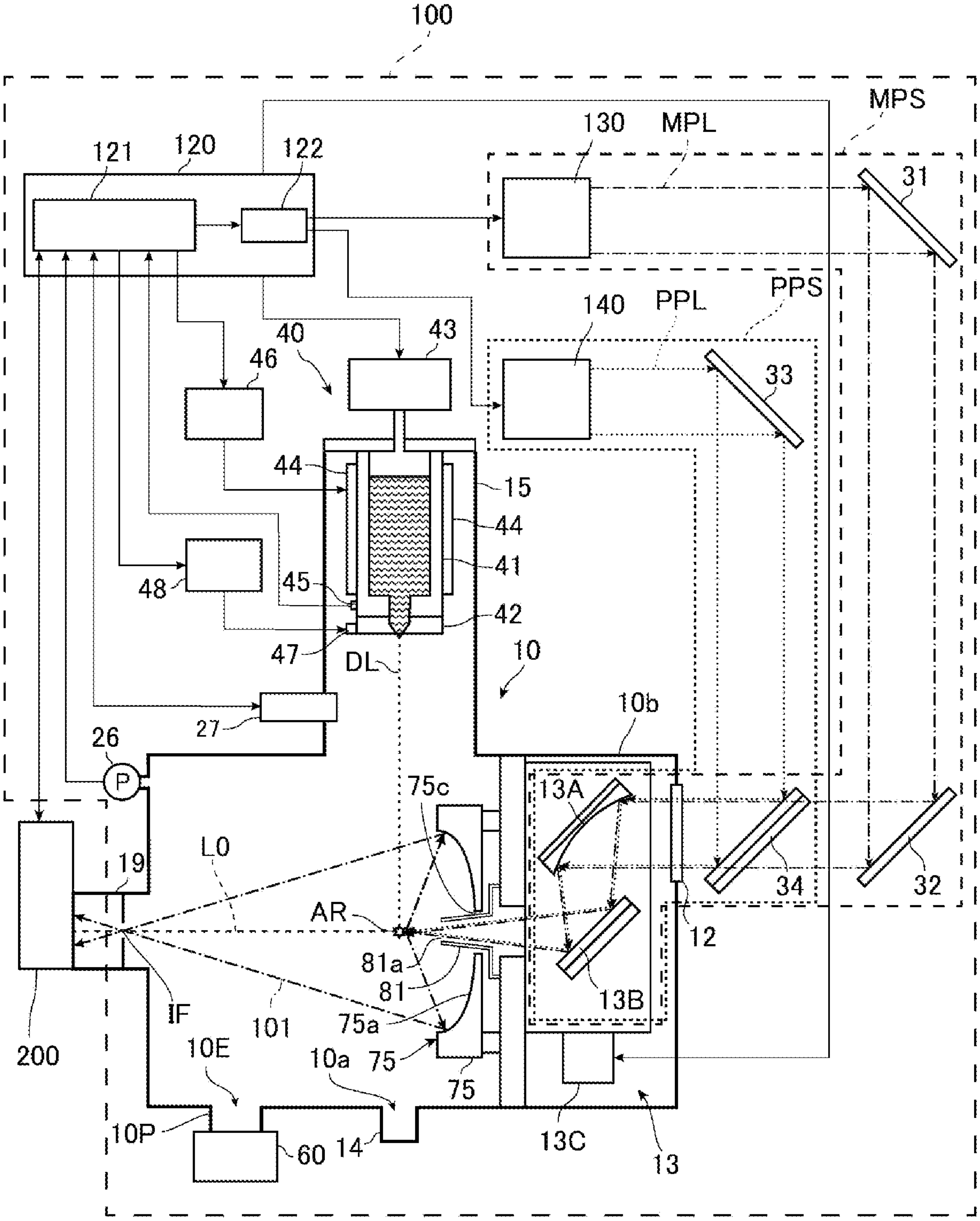
FIG. 3 is a schematic view showing a schematic configuration example of an entire extreme ultraviolet light generation apparatus of a comparative example.

FIG. 3 is a schematic view showing a schematic configuration example of the entire EUV light generation apparatus 100 of the present example. As shown in FIG. 3, the EUV light generation apparatus 100 mainly includes a main pulse laser light irradiation system MPS including a main pulse laser device 130, a prepulse laser light irradiation system PPS including a prepulse laser device 140, a chamber device 10, and a control system 120 including a processor 121.

The chamber device 10 is a sealable container. The chamber device 10 includes an inner wall 10*b* surrounding the internal space having a low pressure atmosphere. The chamber device 10 also includes a sub-chamber 15. A target supply device 40 is attached to the sub-chamber 15 to penetrate a wall of the sub-chamber 15. The target supply device 40 includes a tank 41, a nozzle 42, and a pressure adjuster 43 to supply a droplet target DL to the internal space of the chamber device 10. A droplet target DL is sometimes abbreviated as a droplet or target.

The tank 41 stores therein a target substance which becomes the droplet target DL. The target substance contains tin. The inside of the tank 41 is in communication with the pressure adjuster 43 which regulates the pressure in the tank 41. A heater 44 and a temperature sensor 45 are attached to the tank 41. The heater 44 heats the tank 41 with current applied from a heater power source 46. Through the heating, the target substance in the tank 41 melts. The temperature sensor 45 measures, via the tank 41, the temperature of the target substance in the tank 41. The pressure adjuster 43, the temperature sensor 45, and the heater power source 46 are electrically connected to the processor 121.

The nozzle 42 is attached to the tank 41 and outputs the target substance. A piezoelectric element 47 is attached to the nozzle 42. The piezoelectric element 47 is electrically connected to a piezoelectric power source 48 and is driven by voltage applied from the piezoelectric power source 48. The piezoelectric power source 48 is electrically connected to the processor 121. The target substance output from the nozzle 42 is formed into the droplet target DL through operation of the piezoelectric element 47.

The chamber device 10 includes a target collection unit 14. The target collection unit 14 is a box body attached to an inner wall 10*b* of the chamber device 10 and communicates with the internal space of the chamber device 10 via an opening 10*a* formed at the inner wall 10*b* of the chamber device 10. The opening 10*a* is arranged directly below the nozzle 42. The target collection unit 14 is a drain tank to collect any unnecessary droplet target DL having passed through the opening 10*a* and reaching the target collection unit 14.

At least one through hole is formed in the inner wall 10*b* of the chamber device 10. The through hole is blocked by a window 12 through which pulse laser light output from the main pulse laser device 130 and the prepulse laser device 140 passes.

Further, a laser light concentrating optical system 13 is arranged at the internal space of the chamber device 10. The laser light concentrating optical system 13 includes a laser light concentrating mirror 13A and a high reflection mirror 13B. The laser light concentrating mirror 13A reflects and concentrates the laser light having passed through the window 12. The high reflection mirror 13B reflects light concentrated by the laser light concentrating mirror 13A. Positions of the laser light concentrating mirror 13A and the high reflection mirror 13B are adjusted by a laser light manipulator 13C so that a light concentration position of the laser light at the internal space of the chamber device 10 coincides with a position specified by the processor 121. The light concentration position is adjusted to be positioned directly below the nozzle 42, and when the target substance is irradiated with the laser light at the light concentration position, plasma is generated by the irradiation, and the EUV light 101 is radiated from the plasma. The region in which plasma is generated is sometimes referred to as a plasma generation region AR.

For example, an EUV light concentrating mirror 75 having a spheroidal reflection surface 75*a* is arranged at the internal space of the chamber device 10. The reflection surface 75*a* reflects the EUV light 101 radiated from the plasma in the plasma generation region AR. The reflection surface 75*a* has a first focal point and a second focal point. The reflection surface 75*a* may be arranged such that, for example, the first focal point is located in the plasma generation region AR and the second focal point is located at an intermediate focal point IF. In FIG. 3, a straight line passing through the first focal point and the second focal point is shown as a focal line L0.

Further, the EUV light generation apparatus 100 includes a connection portion 19 providing communication between the internal space of the chamber device 10 and the internal space of the exposure apparatus 200. A wall in which an aperture is formed is arranged inside the connection portion 19. The wall is preferably arranged such that the aperture is located at the second focal point. The connection portion 19 is an outlet port of the EUV light 101 in the EUV light generation apparatus 100, and the EUV light 101 is output from the connection portion 19 and enters the exposure apparatus 200.

Further, the EUV light generation apparatus 100 includes a pressure sensor 26 and a target sensor 27. The pressure sensor 26 and the target sensor 27 are attached to the chamber device 10 and are electrically connected to the processor 121. The pressure sensor 26 measures the pressure at the internal space of the chamber device 10 and outputs a signal indicating the pressure to the processor 121. The target sensor 27 has, for example, an imaging function, and detects the presence, trajectory, position, velocity, and the like of the droplet target DL output from the nozzle hole of the nozzle 42 in accordance with an instruction from the processor 121. The target sensor 27 may be arranged inside the chamber device 10, or may be arranged outside the chamber device 10 and detect the droplet target DL through a window (not shown) arranged on a wall of the chamber device 10. The target sensor 27 includes a light receiving optical system (not shown) and an imaging unit (not shown) such as a charge-coupled device (CCD) or a photodiode. In order to improve the detection accuracy of the droplet target DL, the light receiving optical system forms an image of the trajectory of the droplet target DL and the periphery thereof on a light receiving surface of the imaging unit. When the droplet target DL passes through a light concentration region of a light source unit (not shown) arranged to improve contrast in the field of view of the target sensor 27, the imaging unit detects a change of the light passing through the trajectory of the droplet target DL and the periphery thereof. The imaging unit converts the detected light change into an electric signal as a signal related to the image data of the droplet target DL. The imaging unit outputs the electric signal to the processor 121.

The main pulse laser device 130 is configured by, for example, a YAG laser device or a $CO_2$ laser device, includes a master oscillator that performs a burst operation, and outputs main pulse laser light MPL. In the burst operation, the main pulse laser light MPL is continuously output at a predetermined repetition frequency in a burst-on duration and the output of the main pulse laser light MPL is stopped in a burst-off duration.

The prepulse laser device 140 outputs prepulse laser light PPL. In the example of FIG. 3, the wavelength of the prepulse laser light PPL may be different from the wavelength of the main pulse laser light MPL. Therefore, for example, when the main pulse laser device 130 is a YAG laser device, the prepulse laser device 140 is, for example, a $CO_2$ laser device. The prepulse laser device 140 is configured to output the prepulse laser light PPL at the timing different from the timing at which the main pulse laser light MPL is output from the main pulse laser device 130. This control is performed by the control system 120 described below.

Travel directions of the main pulse laser light MPL and the prepulse laser light PPL are adjusted by a laser light delivery optical system including a plurality of mirrors. The laser light delivery optical system for adjusting the travel direction of the main pulse laser light MPL includes mirrors 31, 32. The laser light delivery optical system for adjusting the travel direction of the prepulse laser light PPL includes a mirror 33 and a dichroic mirror 34. The dichroic mirror 34 reflects the prepulse laser light PPL and transmits the main pulse laser light MPL, thereby substantially overlapping the optical path of the main pulse laser light MPL with the optical path of the prepulse laser light PPL. The orientation of at least one of the mirrors 31 to 34 is adjusted by an actuator (not shown), and according to this adjustment, the main pulse laser light MPL or the prepulse laser light PPL can be appropriately propagated through the window 12 to the internal space of the chamber device 10.

The main pulse laser light irradiation system MPS is a system for irradiating a target substance with the main pulse laser light MPL. Therefore, in the present example, the main pulse laser light irradiation system MPS includes the mirrors 31, 32, the dichroic mirror 34, and the laser light concentrating optical system 13, in addition to the main pulse laser device 130. Further, the prepulse laser light irradiation system PPS is a system for irradiating a target substance with the prepulse laser light PPL. Therefore, in the present example, the prepulse laser light irradiation system PPS includes the mirror 33, the dichroic mirror 34, and the laser light concentrating optical system 13 in addition to the prepulse laser device 140.

The processor 121 of the control system 120 of the present disclosure is a processing device including a storage device in which a control program is stored and a central processing unit (CPU) that executes the control program. The processor 121 is specifically configured or programmed to perform various processes included in the present disclosure and controls the entire EUV light generation apparatus 100. The processor 121 receives a signal related to the pressure in the internal space of the chamber device 10, which is measured by the pressure sensor 26, a signal related to image data of the droplet target DL captured by the target sensor 27, a burst signal instructing the burst operation from the exposure apparatus 200, and the like. The processor 121 processes the various signals, and may control, for example, a timing at which the droplet target DL is output, an output direction of the droplet target DL, and the like. Further, the processor 121 may control output timings of the main pulse laser device 130 and the prepulse laser device 140, the travel directions of the main pulse laser light MPL and the prepulse laser light PPL, light concentrating positions of the main pulse laser light MPL and the prepulse laser light PPL, and the like. Such various kinds of control described above are merely exemplary, and other control may be added as necessary, as described later.

The processor 121 of the present example is electrically connected to the main pulse laser device 130 and the prepulse laser device 140 via a delay circuit 122. The delay circuit 122 slightly changes the trigger signals for the main pulse laser device 130 and the prepulse laser device 140 output from the processor 121. Specifically, the trigger signals input to the main pulse laser device 130 and the prepulse laser device 140 are shifted so that the irradiation timing of the main pulse laser device 130 is later than the irradiation timing of the prepulse laser device 140.

A central gas supply unit 81 for supplying etching gas to the internal space of the chamber device 10 is arranged at the chamber device 10. As described above, since the target substance contains tin, the etching gas is, for example, hydrogen-containing gas having hydrogen gas concentration of 100% in effect. Alternatively, the etching gas may be, for example, balance gas having hydrogen gas concentration of approximately 3%. The balance gas contains nitrogen ($N_2$) gas and argon (Ar) gas. Tin fine particles and tin charged particles are generated when the target substance constituting the droplet target DL is turned into plasma in the plasma generation region AR by being irradiated with the main pulse laser light MPL. Tin constituting these fine particles and charged particles reacts with hydrogen contained in the etching gas supplied to the internal space of the chamber device 10. Through the reaction with hydrogen, tin becomes stannane ($SnH_4$) gas at room temperature.

The central gas supply unit 81 has a side surface shape of a circular truncated cone, and is inserted through a through hole 75*c* formed in the center of the EUV light concentrating mirror 75. The central gas supply unit 81 is called a cone in some cases. Further, the central gas supply unit 81 has a central gas supply port 81*a* being a nozzle. The central gas supply port 81*a* is provided on the focal line L0 passing through the first focal point and the second focal point of the reflection surface 75*a*. The focal line L0 is extended along the center axis direction of the reflection surface 75*a*. The central gas supply port 81*a* supplies the etching gas from the center side of the reflection surface 75*a* toward the plasma generation region AR. Here, it is preferable that the etching gas is supplied from the central gas supply port 81*a* along the focal line L0 in the direction away from the reflection surface 75*a* from the center side of the reflection surface 75*a*. The central gas supply port 81*a* is connected to a gas supply device (not shown) being a tank through a pipe (not shown) of the central gas supply unit 81 and the etching gas is supplied therefrom. The gas supply device is driven and controlled by the processor 121. A supply gas flow rate adjusting unit being a valve (not shown) may be arranged in the pipe (not shown).

The central gas supply port 81*a* is a gas supply port for supplying the etching gas to the internal space of the chamber device 10 as well as an outlet port through which the prepulse laser light PPL and the main pulse laser light MPL are output to the internal space of the chamber device 10. The prepulse laser light PPL and the main pulse laser light MPL travel toward the internal space of the chamber device 10 through the window 12 and the central gas supply port 81*a*.

An exhaust port 10E is arranged at the inner wall 10*b* of the chamber device 10. Since the exposure apparatus 200 is arranged on the focal line L0, the exhaust port 10E is arranged at the inner wall 10*b* on the side lateral to the focal line L0. The direction along the center axis of the exhaust port 10E is, for example, perpendicular to the focal line L0. The exhaust port 10E is arranged on the side opposite to the reflection surface 75*a* with respect to the plasma generation region AR when viewed from the direction perpendicular to the focal line L0. The exhaust port 10E exhausts gas at the internal space of the chamber device 10. The exhaust port 10E is connected to an exhaust pipe 10P, and the exhaust pipe 10P is connected to an exhaust pump 60.

As described above, when the target substance is turned into plasma in the plasma generation region AR, the residual gas as exhaust gas is generated at the internal space of the chamber device 10. Residual gas contains fine particles and charged particles of tin generated through the plasma generation from the target substance, stannane generated through the reaction of the fine particles and charged particles of tin with the etching gas, and unreacted etching gas. Some of the charged particles are neutralized at the internal space of the chamber device 10, and the residual gas contains the neutralized charged particles as well. The residual gas is sucked to the exhaust pump 60 through the exhaust port 10E and the exhaust pipe 10P.

3.2 Operation

Figure 4:
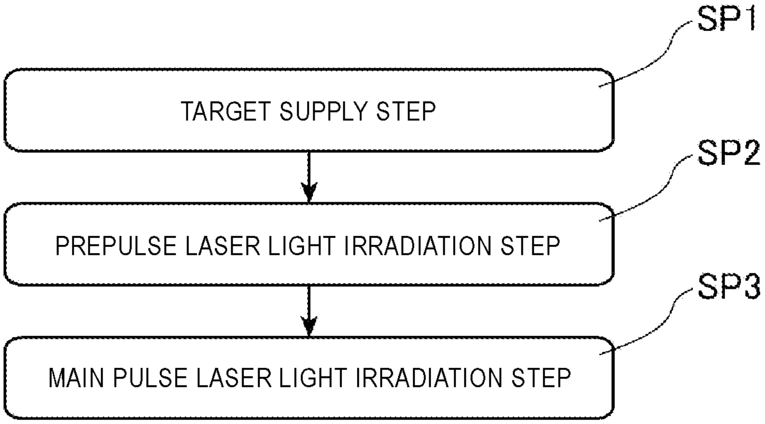
FIG. 4 is a flowchart showing the operation of the extreme ultraviolet light generation apparatus.

Next, operation of the EUV light generation apparatus 100 of the comparative example will be described. FIG. 4 is a flowchart showing the operation of the EUV light generation apparatus 100. As shown in FIG. 4, the EUV light generation method of the present example includes a target supply step SP1, a prepulse laser light irradiation step SP2, and a main pulse laser light irradiation step SP3.

Before the target supply step SP1, preparation for operating the EUV light generation apparatus 100 is performed. In the EUV light generation apparatus 100, for example, at the time of new installation or maintenance or the like, atmospheric air at the internal space of the chamber device 10 is exhausted. At this time, purging and exhausting of the internal space of the chamber device 10 may be repeated for exhausting atmospheric components. For example, inert gas such as nitrogen or argon is preferably used for the purge gas. Thereafter, when the pressure at the internal space of the chamber device 10 becomes equal to or lower than a predetermined pressure, the processor 121 starts introduction of the etching gas from the gas supply device to the internal space of the chamber device 10 through the central gas supply unit 81. At this time, the processor 121 may control the supply gas flow rate adjusting unit (not shown) and the exhaust pump 60 so that the pressure at the internal space of the chamber device 10 is maintained at the predetermined pressure. Thereafter, the processor 121 waits until a predetermined time elapses from the start of introduction of the etching gas.

Further, the processor 121 causes the gas at the internal space of the chamber device 10 to be exhausted from the exhaust port 10E by the exhaust pump 60, and keeps the pressure at the internal space of the chamber device 10 substantially constant based on the signal of the pressure at the internal space of the chamber device 10 measured by the pressure sensor 26.

In order to heat and maintain the target substance in the tank 41 at a predetermined temperature equal to or higher than the melting point, the processor 121 causes the heater power source 46 to supply current to the heater 44 to increase temperature of the heater 44. In this case, the processor 121 controls the temperature of the target substance to the predetermined temperature by adjusting a value of the current supplied from the heater power source 46 to the heater 44 based on an output from the temperature sensor 45. When the target substance is tin, the predetermined temperature is equal to or higher than 231.93° C. being the melting point of tin and, for example, is 240° C. or higher and 290° C. or lower. Thus, the preparation for outputting the droplet target DL is completed.

(Target Supply Step SP1)

This step is a step of outputting the droplet target DL into the chamber device 10. In this step, the processor 121 causes the pressure adjuster 43 to supply the inert gas from the gas supply source to the tank 41 and to adjust the pressure in the tank 41 so that the melted target substance is output through the nozzle hole of the nozzle 42 at a predetermined velocity. Under this pressure, the target substance is output through the nozzle hole of the nozzle 42. The target substance output through the nozzle hole may be in the form of a jet. At this time, the processor 121 causes the piezoelectric power source 48 to apply voltage having a predetermined waveform to the piezoelectric element 47 to generate the droplet target DL. The piezoelectric power source 48 applies voltage so that the waveform of the voltage value becomes, for example, a sine wave, a rectangular wave, or a sawtooth wave. Vibration of the piezoelectric element 47 can propagate through the nozzle 42 to the target substance to be output through the nozzle hole of the nozzle 42. The target substance is divided at a predetermined cycle by the vibration into liquid droplet target DL. The diameter of the droplet target DL is approximately 20 μm or less.

(Prepulse Laser Light Irradiation Step SP2)

This step is a step of irradiating the droplet target DL with the prepulse laser light PPL to generate a diffusion target. When the droplet target DL is output, the target sensor 27 detects the passage timing of the droplet target DL passing through a predetermined position at the internal space of the chamber device 10. The processor 121 outputs the trigger signal to control the timing of outputting the prepulse laser light PPL from the prepulse laser device 140 based on the signal from the target sensor 27 so that the droplet target DL is irradiated with the prepulse laser light PPL. The trigger signal output from the processor 121 is input to the prepulse laser device 140 and the main pulse laser device 130 via the delay circuit 122. Here, the delay circuit 122 outputs the trigger signal to the prepulse laser device 140 prior to the main pulse laser device 130. The prepulse laser device 140 outputs the prepulse laser light PPL when the trigger signal is input. At the timing when the prepulse laser light PPL is output, the main pulse laser light MPL is not output.

The prepulse laser light PPL has a Gaussian-type energy density profile, and is a picosecond pulse laser light having a temporal pulse width $\tau_{PPL}$ of, for example, 10 ps or more and 100 ps or less, or a nanosecond pulse laser light having a pulse width of, for example, 10 ns or more and 300 ns or less. Here, the pulse width is an interval between times when the intensity of the laser light becomes a half value of the maximum value before and after the intensity becomes the maximum value. The picosecond pulse laser light and the nanosecond pulse laser light have substantially the same energy per pulse. Therefore, the picosecond pulse laser light has a higher energy density than the nanosecond pulse laser light. Here, the fluence of the prepulse laser light PPL is, for example, 0.1 J/cm$^2$ or more and 100 J/cm$^2$ or less. Preferably, the fluence is equal to or larger than to 1 J/cm$^2$ and equal to or smaller than 20 J/cm$^2$ for picosecond pulse laser light and equal to or larger than 1 J/cm$^2$ and equal to or smaller than 3 J/cm$^2$ for nanosecond pulse laser light. The prepulse laser light PPL output from the prepulse laser device 140 is reflected by the mirror 33 and the dichroic mirror 34, and is radiated to the droplet target DL via the laser light concentrating optical system 13. At this time, the processor 121 controls the laser light manipulator 13C of the laser light concentrating optical system 13 so that the prepulse laser light PPL is concentrated in the vicinity of the plasma generation region AR. The droplet target DL irradiated with the prepulse laser light PPL is diffused by laser ablation due to the energy of the laser light, and becomes a diffusion target. Therefore, the prepulse laser light irradiation system PPS is a system for generating a diffusion target by irradiating the droplet target DL with the prepulse laser light PPL.

Figure 5:
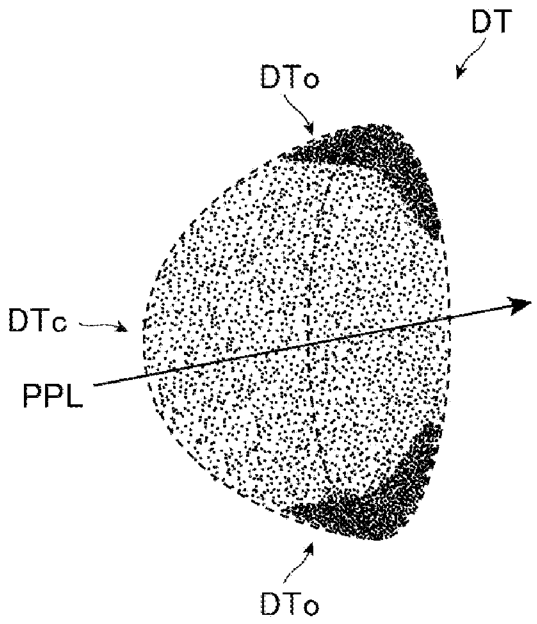
FIG. 5 is a view showing a state of a diffusion target irradiated with picosecond pulse laser light as prepulse laser light.
Figure 6:
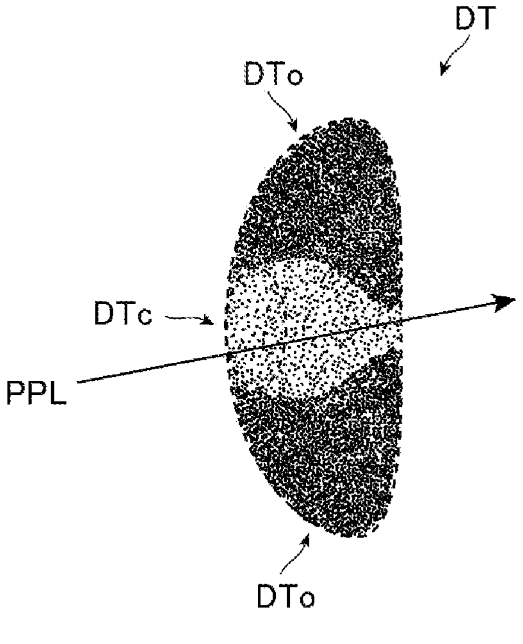
FIG. 6 is a view showing a state of a diffusion target irradiated with nanosecond pulse laser light as prepulse laser light.

Since the diffusion target is a target in which the droplet target DL is diffused, the diameter thereof is larger than that of the droplet target DL, and the density thereof is lower than that of the droplet target DL. As described above, the diameter of the droplet target DL is approximately 20 μm or less, whereas the diameter of the diffusion target is approximately 70 μm. FIG. 5 is a view showing a state of a diffusion target irradiated with picosecond pulse laser light as the prepulse laser light PPL, and FIG. 6 is a view showing a state of a diffusion target irradiated with nanosecond pulse laser light as the prepulse laser light PPL. As shown in FIGS. 5 and 6, in each diffusion target DT, the density of the target substance is higher at the outer peripheral portion DTo than at the central portion DTc. However, since the diffusion target DT generated by irradiation with the picosecond pulse laser light is generated by irradiation with laser light having high energy in a short time, the difference in density of the target substance between the central portion DTc and the outer peripheral portion DTo is large.

(Main Pulse Laser Light Irradiation Step SP3)

This step is a step of irradiating the diffusion target DT with the main pulse laser light MPL to generate EUV light. When the trigger signal is input to the main pulse laser device 130 with a delay from the timing at which the trigger signal is input to the prepulse laser device 140, the main pulse laser device 130 outputs the main pulse laser light MPL. The time difference between the output timing of the prepulse laser light PPL and the output timing of the main pulse laser light MPL is, for example, 50 ns or more and 500 ns or less in the case of the picosecond pulse laser light, and 50 ns or more and 150 ns or less in the case of the nanosecond pulse laser light. The processor 121 and the delay circuit 122 output the light emission trigger signal to control the timing at which the main pulse laser light MPL is output from the main pulse laser device 130 so that the diffusion target DT is irradiated with the main pulse laser light MPL.

The main pulse laser light MPL has a Gaussian-type energy density profile, and is laser light having a pulse width of, for example, 1 ns or more and 50 ns or less, more preferably 15 ns or more and 20 ns or less. The main pulse laser light MPL output from the main pulse laser device 130 is reflected by the mirrors 31, 32, transmitted through the dichroic mirror 34, and radiated to the diffusion target DT in the plasma generation region AR via the laser light concentrating optical system 13. At this time, the processor 121 controls the laser light manipulator 13C of the laser light concentrating optical system 13 so that the main pulse laser light MPL is concentrated in the plasma generation region AR. The diffusion target DT irradiated with the main pulse laser light MPL is turned into plasma due to the energy of the laser light, and light including EUV light is radiated from the plasma. Thus, the main pulse laser light irradiation system MPS is a system for generating EUV light by irradiating the diffusion target DT with the main pulse laser light MPL.

When the diffusion target DT in which the density of the target substance is lowered is irradiated with the main pulse laser light MPL as described above, a larger amount of the target substance may be turned into plasma and EUV light may be efficiently radiated, compared to a case in which the droplet target DL is directly irradiated with the main pulse laser light MPL.

Among the light including the EUV light generated in the plasma generation region AR, the EUV light 101 is concentrated at the intermediate focal point IF by the EUV light concentrating mirror 75, and then is incident on the exposure apparatus 200 from the connection portion 19.

Here, when the target substance is turned into plasma, tin fine particles are generated as described above. The fine particles diffuse to the internal space of the chamber device 10. The fine particles diffusing to the internal space of the chamber device 10 react with the hydrogen-containing etching gas supplied from the central gas supply unit 81 to become stannane. Most of the stannane obtained through the reaction with the etching gas flows into the exhaust port 10E along with the flow of the unreacted etching gas. At least some of the unreacted charged particles, fine particles, and etching gas flow into the exhaust port 10E.

The unreacted etching gas, fine particles, charged particles, stannane, and the like having flowed into the exhaust port 10E flow as residual gas through the exhaust pipe 10P into the exhaust pump 60 and are subjected to predetermined exhaust treatment such as detoxification.

3.3 Problem

When the diffusion target DT is irradiated with the main pulse laser light MPL having the Gaussian-type energy density profile as in the EUV light generation apparatus 100 of the comparative example, the target substance is turned into plasma with a high probability at a central portion DTc of the diffusion target DT. However, in the EUV light generation apparatus 100 of the comparative example, of the main pulse laser light MPL radiated to the diffusion target DT, the laser light radiated to an outer peripheral portion DTo has a lower energy density than the laser light radiated to the central portion DTc. Therefore, in the outer peripheral portion DTo where the density of the target substance is high, the target substance is less likely to be turned into plasma. The unreacted target substance which is not turned into plasma is discharged from the exhaust pipe 10P or becomes debris and adheres to the inner wall 10*b* of the chamber device 10 or the reflection surface 75*a* of the EUV light concentrating mirror 75. Thus, the unreacted target substance does not contribute to the generation of EUV light. Therefore, there is a demand for more efficient generation of EUV light.

Therefore, in the following embodiments, an EUV light generation method and an EUV light generation apparatus capable of efficiently generating EUV light will be exemplified.

4. Description of Extreme Ultraviolet Light Generation Apparatus of First Embodiment Next, the configuration of the EUV light generation apparatus 100 of a first embodiment will be described. Any component same as that described above is denoted by an identical reference sign, and duplicate description thereof is omitted unless specific description is needed.

4.1 Configuration

Figure 7:
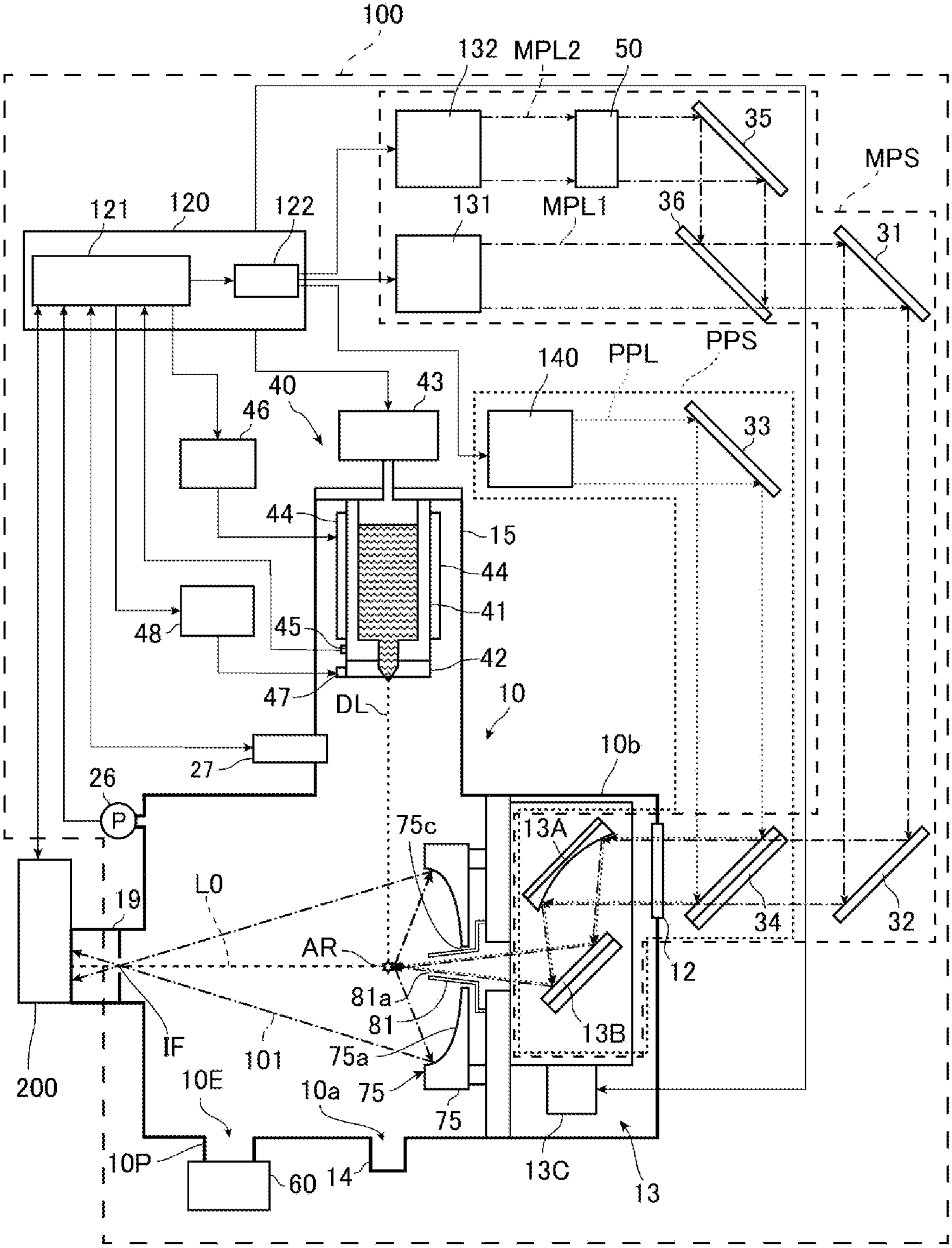
FIG. 7 is a schematic view showing a schematic configuration example of the entire extreme ultraviolet light generation apparatus of a first embodiment.

FIG. 7 is a schematic view showing a schematic configuration example of the entire EUV light generation apparatus 100 of the present embodiment. As shown in FIG. 7, in the EUV light generation apparatus 100 of the present embodiment, the configuration of the main pulse laser light irradiation system MPS is different from the configuration of the main pulse laser light irradiation system MPS of the comparative example. The main pulse laser light irradiation system MPS of the present embodiment is different from the main pulse laser light irradiation system MPS of the comparative example in including a first main pulse laser device 131, a second main pulse laser device 132, a beam adjustment optical system 50, a mirror 35, and a polarizer 36.

The first and second main pulse laser devices 131, 132 are electrically connected to the processor 121 via the delay circuit 122. The first main pulse laser device 131 outputs first main pulse laser light MPL1 having a Gaussian-type energy density higher at the central portion than at the outer peripheral portion, and the second main pulse laser device 132 outputs second main pulse laser light MPL2 having a similar energy density distribution. That is, the main pulse laser light of the present embodiment includes the first main pulse laser light MPL1 and the second main pulse laser light MPL2. In the present embodiment, the first main pulse laser light MPL1 and the second main pulse laser light MPL2 have the same wavelength and are polarized in directions different from each other by 90°. The first main pulse laser device 131 and the second main pulse laser device 132 are, for example, both YAG laser devices or both $CO_2$ laser devices.

The polarizer 36 is arranged at a position on which the first main pulse laser light MPL1 is incident. The polarization direction of the laser light to be highly transmitted through the polarizer 36 coincides with the polarization direction of the first main pulse laser light MPL1. Therefore, the first main pulse laser light MPL1 is transmitted through the polarizer 36.

The beam adjustment optical system 50 is arranged at a position on which the second main pulse laser light MPL2 is incident. The beam adjustment optical system 50 is an optical system which converts laser light having a higher energy density at the central portion than at the outer peripheral portion into laser light having a higher energy density at the outer peripheral portion than at the central portion. For example, the beam adjustment optical system 50 converts laser light having a Gaussian-type energy density in the longitudinal section into laser light having an annular energy density in the longitudinal section. Therefore, the second main pulse laser light MPL2 incident on the beam adjustment optical system 50 is converted into laser light having an annular energy density.

Figure 8:
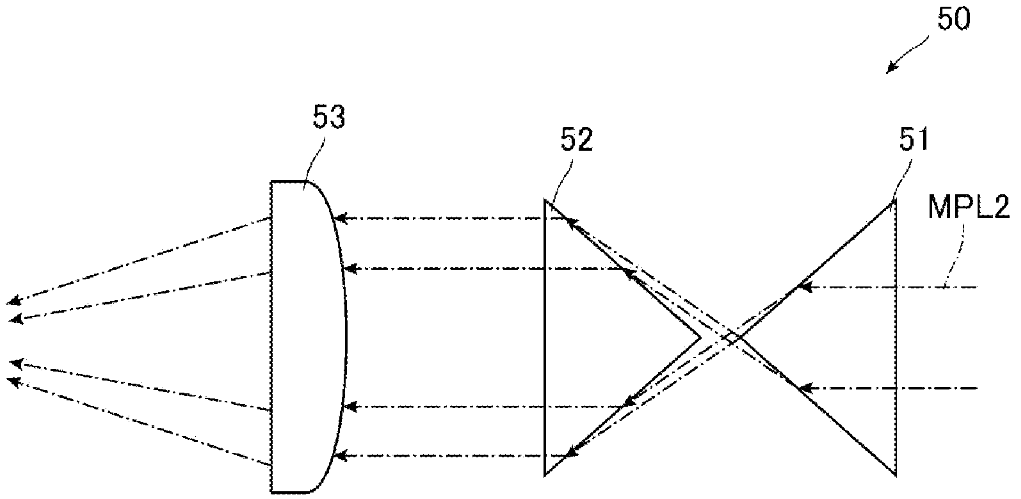
FIG. 8 is a schematic view showing an example of a beam adjustment optical system.

FIG. 8 is a schematic view showing an example of the beam adjustment optical system 50. The beam adjustment optical system 50 of the present example includes a pair of axicon lenses 51, 52 and a light concentrating lens 53. Each axicon lens 51, 52 is a conical lens. The axicon lens 51 and the axicon lens 52 are arranged such that their apexes face each other with a predetermined gap therebetween and their rotational symmetric axes coincide with the optical axis of the second main pulse laser light MPL2. Further, the axicon lens 51 on one side is arranged such that the second main pulse laser light MPL2 is incident from the center of the bottom surface thereof along the rotational symmetric axis thereof. Therefore, the second main pulse laser light MPL2 propagates along the rotational symmetric axis of the axicon lens 52 on the other side. Further, the light concentrating lens 53 is arranged such that the surface on which the second main pulse laser light MPL2 is incident faces the bottom surface of the axicon lens 52 on the other side.

When the second main pulse laser light MPL2 having a Gaussian-type energy density distribution is incident from the bottom surface of the axicon lens 51, the laser light is converted into laser light having a higher energy density at the outer peripheral portion than at the central portion and is output from the bottom surface of the axicon lens 52. In this example, the annular second main pulse laser light MPL2 is output from the axicon lens 52.

The light concentrating lens 53 concentrates the second main pulse laser light MPL2 output from the bottom surface of the axicon lens 52. The annular second main pulse laser light MPL2 has a Gaussian-type energy density distribution at the focal point due to concentration of the annulus, but has an annular energy density distribution in the vicinity of the focal point. In this example, the radius of curvature of the light concentrating lens 53 is determined such that the second main pulse laser light MPL2 is concentrated in the plasma generation region AR with an annular energy density distribution. Here, a light concentrating mirror may be used in place of the light concentrating lens 53. In this example, description has been provided on the example of FIG. 8. However, the beam adjustment optical system 50 of the present embodiment is not limited to the example of FIG. 8 as long as being an optical system which converts laser light having a higher energy density at the central portion than at the outer peripheral portion into laser light having a higher energy density at the outer peripheral portion than at the central portion.

The mirror 35 reflects the second main pulse laser light MPL2 output from the beam adjustment optical system 50 toward the polarizer 36. As described above, since the polarization directions of the first main pulse laser light MPL1 and the second main pulse laser light MPL2 are different from each other by 90°, the polarization direction of light to be transmitted through the polarizer 36 is different from that of the second main pulse laser light MPL2. Therefore, the polarizer 36 reflects the second main pulse laser light MPL2. The polarizer 36 is arranged at an angle at which the optical path of the first main pulse laser light MPL1 transmitted through the polarizer 36 and the optical path of the second main pulse laser light MPL2 reflected by the polarizer 36 substantially coincide with each other. The first main pulse laser light MPL1 and the second main pulse laser light MPL2 output from the polarizer 36 are reflected by the mirror 31, propagate along the similar optical path to that of the main pulse laser light MPL of the comparative example, are concentrated in the plasma generation region AR, and are radiated onto the diffusion target DT. However, in the present embodiment, as will be described later, the first main pulse laser light MPL1 and the second main pulse laser light MPL2 are radiated to the diffusion target DT at different timings.

Figure 9:
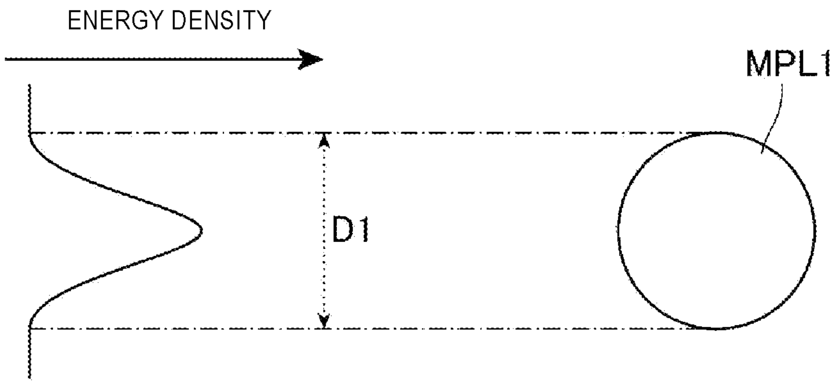
FIG. 9 is a diagram showing an energy density distribution of first main pulse laser light to be radiated to the diffusion target.

FIG. 9 is a diagram showing an energy density distribution of the first main pulse laser light MPL1 to be radiated to the diffusion target DT. As described above, since the first main pulse laser light MPL1 does not pass through the beam adjustment optical system 50, the first main pulse laser light MPL1 is a Gaussian-type laser light having a higher energy density at the central portion than at the outer peripheral portion. In FIG. 9, the diameter of the first main pulse laser light MPL1 is indicated by D1. The diameter D1 is a diameter at which intensity of laser light is $1/e^2$ of the peak intensity in the cross section of the laser light. The diameter D1 is preferably equal to or larger than the diameter of the diffusion target DT in the direction perpendicular to the optical axis of the first main pulse laser light MPL1, and is preferably equal to or larger than 20 μm and equal to or smaller than 100 μm.

Figure 10:
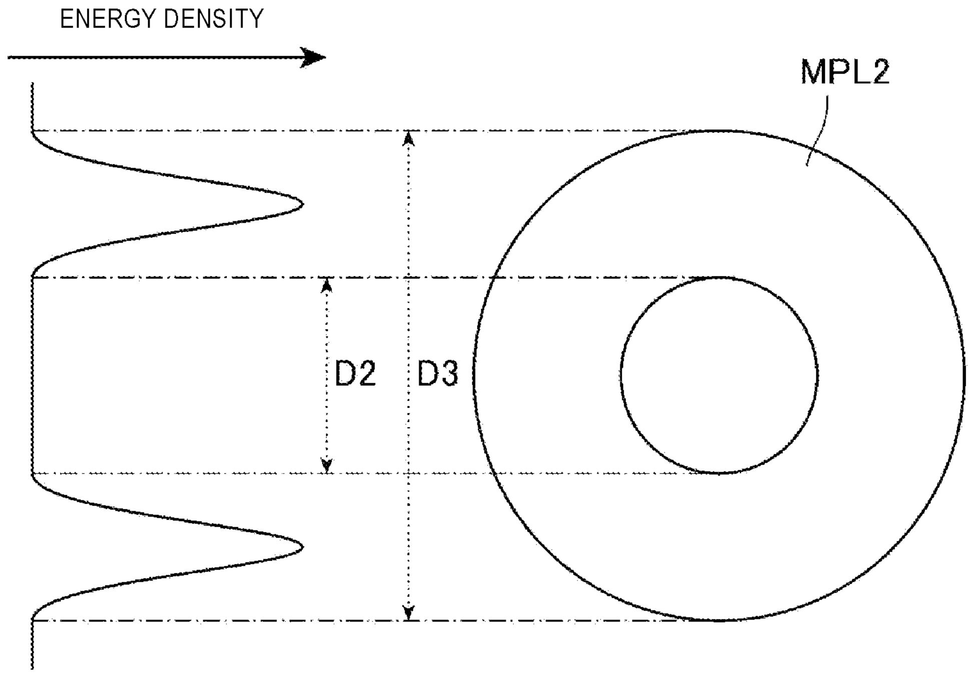
FIG. 10 is a diagram showing an energy density distribution of second main pulse laser light to be radiated to the diffusion target.

FIG. 10 is a diagram showing an energy density distribution of the second main pulse laser light MPL2 to be radiated to the diffusion target DT. As described above, since the second main pulse laser light MPL2 passes through the beam adjustment optical system 50, the second main pulse laser light MPL2 is annular laser light having a higher energy density at the outer peripheral portion than at the central portion. In FIG. 10, the inner diameter of the second main pulse laser light MPL2 is indicated by D2 and the outer diameter thereof is indicated by D3. The inner diameter D2 and the outer diameter D3 are diameters respectively at which intensity of laser light is $1/e^2$ of the peak intensity in the cross section of the laser light. The outer diameter D3 is preferably equal to or larger than the diameter of the diffusion target DT in the direction perpendicular to the optical axis of the second main pulse laser light MPL2, and is preferably equal to or larger than 20 μm and equal to or smaller than 100 μm.

Further, it is preferable that D2≤D1 is satisfied. Owing to that the diameter D1 of the first main pulse laser light MPL1 is equal to or larger than the inner diameter D2 of the second main pulse laser light MPL2, it is possible to suppress a space from being formed between the outer circumference of the first main pulse laser light MPL1 and the inner circumference of the second main pulse laser light MPL2, thereby suppressing the diffusion target DT from not being turned into plasma. In particular, D1=D2 is preferable. In this case, it is possible to prevent the first main pulse laser light MPL1 and the second main pulse laser light MPL2 from being radiated to the same position of the diffusion target DT, and to cause the diffusion target DT to efficiently absorb the laser light. Further, it is preferable that D1≤D3 is satisfied. Here, D2<D3 is satisfied, and the outer diameter D3 of the second main pulse laser light MPL2 is equal to or larger than the diameter D1 of the first main pulse laser light MPL1. Although there is a possibility that the number of diffusion targets which are not turned into plasma increases compared to the above, D1<D2 or D3<D1 may be satisfied.

Further, the fluence of the second main pulse laser light MPL2 is preferably higher than the fluence of the first main pulse laser light MPL1. Even in the case in which the droplet target DL is irradiated with picosecond pulse laser light or nanosecond pulse laser light as the prepulse laser light PPL as described above, the density of the target substance is higher at the outer peripheral portion DTo than at the central portion DTc in the diffusion target DT. Therefore, when the fluence has the above-described relationship, it is possible to radiate laser light with higher energy to a part of the diffusion target DT where the density of the target substance is high, to cause the diffusion target DT to efficiently absorb the laser light, and to cause the diffusion target DT to be further turned into plasma. The fluence of the first main pulse laser light MPL1 is a value obtained by dividing the energy of the first main pulse laser light MPL1 by the area of the circle having the diameter D1, and the fluence of the second main pulse laser light MPL2 is a value obtained by dividing the energy of the second main pulse laser light MPL2 by the difference between the area of the circle having the diameter D3 and the area of the circle having the diameter D2. Here, the fluence of the first main pulse laser light MPL1 may be equal to or larger than the fluence of the second main pulse laser light MPL2.

4.2 Operation

Next, operation of the EUV light generation apparatus 100 of the present embodiment will be described. The flowchart showing the operation of the EUV light generation apparatus 100 of the present embodiment is similar to the flowchart showing the operation of the EUV light generation apparatus 100 of the comparative example shown in FIG. 4. However, in the present embodiment, the main pulse laser light irradiation step SP3 is different from the above. Since the target supply step SP1 and the prepulse laser light irradiation step SP2 of the present embodiment are similar to those of the comparative example, the main pulse laser light irradiation step SP3 will be described.

(Main Pulse Laser Light Irradiation Step SP3)

This step in the present embodiment is a step of irradiating the diffusion target DT with the first main pulse laser light MPL1 and the second main pulse laser light MPL2. In the present embodiment, after the prepulse laser light PPL is output from the prepulse laser device 140, the first main pulse laser device 131 first outputs the first main pulse laser light MPL1. The first main pulse laser light MPL1 transmits through the polarizer 36, is reflected by the mirrors 31, 32, transmits through the dichroic mirror 34, and reaches the plasma generation region via the laser light concentrating optical system 13 to be radiated to the diffusion target DT.

Figure 11:
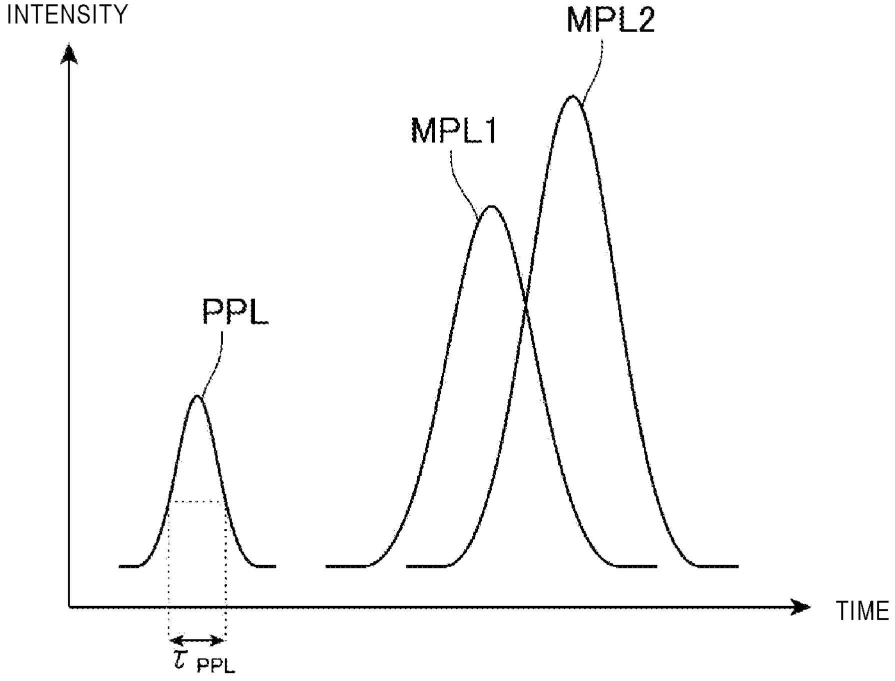
FIG. 11 is a diagram showing the timing and intensity at which target substance is irradiated with each laser light.

FIG. 11 is a diagram showing the timing and intensity at which the target substance is irradiated with each laser light. As shown in FIG. 11, after the prepulse laser light PPL is output from the prepulse laser device 140, the target substance is irradiated with the first main pulse laser light MPL1. The time interval from the irradiation timing of the droplet target DL with the prepulse laser light PPL to the irradiation timing of the diffusion target DT with the first main pulse laser light MPL1 is, for example, 50 ns or more and 500 ns or less in the case of the picosecond pulse laser light, and 50 ns or more and 150 ns or less in the case of the nanosecond pulse laser light, as described above. Accordingly, the processor 121 and the delay circuit 122 output the light emission trigger signal to the first main pulse laser device 131 so that the first main pulse laser light MPL1 is radiated to the diffusion target DT at such time interval.

Owing to that the diffusion target DT is irradiated with the first main pulse laser light MPL1, the central portion DTc of the diffusion target DT is mainly turned into plasma, and EUV light is radiated from the diffusion target DT. Therefore, the density of the target substance is further reduced in the central portion DTc of the diffusion target DT irradiated with the first main pulse laser light MPL1. Further, since the first main pulse laser light MPL1 is also radiated to the periphery of the outer peripheral portion DTo of the diffusion target DT, the density of the target substance is also reduced near the inner periphery of the outer peripheral portion DTo of the diffusion target DT. Here, since the energy density of the central portion of the first main pulse laser light MPL1 is higher than that of the outer peripheral portion thereof, the central portion DTc of the diffusion target DT is turned into plasma more than the periphery of the outer peripheral portion DTo.

Following to the output of the first main pulse laser light MPL1 from the first main pulse laser device 131, the second main pulse laser device 132 outputs the second main pulse laser light MPL2. The second main pulse laser light MPL2 is converted by the beam adjustment optical system 50 from a state in which the energy density is higher at the central portion than at the outer peripheral portion to a state in which the energy density is higher at the outer peripheral portion than at the central portion. The second main pulse laser light MPL2 output from the beam adjustment optical system 50 is reflected by the mirror 35 and the polarizer 36, and then propagates on the same optical path as the first main pulse laser light MPL1. Then, the second main pulse laser light MPL2 reaches the plasma generation region AR and is radiated to the diffusion target DT irradiated with the first main pulse laser light MPL1.

The time interval from the irradiation timing of the diffusion target DT with the first main pulse laser light MPL1 to the irradiation timing of the diffusion target DT with the second main pulse laser light MPL2 is preferably 1 ns or more and 10 ns or less. Therefore, the time interval from the irradiation timing of the diffusion target DT with the first main pulse laser light MPL1 to the irradiation timing of the diffusion target DT with the second main pulse laser light MPL2 is shorter than the time interval from the irradiation timing of the droplet target DL with the prepulse laser light PPL to the irradiation timing of the diffusion target DT with the first main pulse laser light MPL1. The processor 121 and the delay circuit 122 output the trigger signal to the second main pulse laser device 132 with a delay from the timing at which the trigger signal is input to the first main pulse laser device 131 so that the diffusion target DT is irradiated with the second main pulse laser light MPL2 as described above.

Owing to that the diffusion target DT is irradiated with the second main pulse laser light MPL2, the outer peripheral portion DTo of the diffusion target DT is mainly turned into plasma, and EUV light is radiated from the diffusion target DT. Thus, by irradiation to the diffusion target DT with the first main pulse laser light MPL1 and the second main pulse laser light MPL2, the entire diffusion target DT can be turned into plasma.

4.3 Effects

According to the EUV light generation apparatus 100 and the EUV light generation method of the present embodiment, the diffusion target DT is irradiated with the first main pulse laser light MPL1 having higher energy density at the central portion than at the outer peripheral portion and the second main pulse laser light MPL2 having higher energy density at the outer peripheral portion than at the central portion. As described above, in the diffusion target DT, the density of the target substance is higher at the outer peripheral portion DTo than at the central portion DTc. Therefore, the low-density target substance in the central portion DTc can be mainly turned into plasma by the first main pulse laser light MPL1, and the high-density target substance in the outer peripheral portion DTo can be mainly turned into plasma by the second main pulse laser light MPL2. Thus, according to the EUV light generation apparatus 100 and the EUV light generation method of the present embodiment, the amount of the unreacted target substance which is not turned into plasma can be reduced, and EUV light can be generated more efficiently.

The second main pulse laser light MPL2 is not limited to annular laser light as long as being laser light having higher energy density at the outer peripheral portion than at the central portion. For example, the energy density is higher at the outer peripheral portion than at the central portion and the intensity of laser light at the central portion may be $1/e^2$ or more of the peak intensity.

Further, according to the EUV light generation apparatus 100 and the EUV light generation method of the present embodiment, the first main pulse laser light MPL1 and the second main pulse laser light MPL2 are radiated to the diffusion target DT at different timings. Therefore, when there is a region where the first main pulse laser light MPL1 and the second main pulse laser light MPL2 overlap, an unnecessary increase in energy density in the region can be suppressed. However, in the present disclosure, the first main pulse laser light MPL1 and the second main pulse laser light MPL2 may be radiated to the diffusion target DT at the same time.

Further, according to the EUV light generation apparatus 100 and the EUV light generation method of the present embodiment, the first main pulse laser light MPL1 and the second main pulse laser light MPL2 are radiated to the diffusion target DT in the order thereof. With this configuration, the low-density target substance in the central portion DTc can be mainly turned into plasma by the first main pulse laser light MPL1, and the high-density target substance in the outer peripheral portion DTo of the diffusion target DT can be turned into plasma. Therefore, the second main pulse laser light MPL2 can be efficiently radiated to the high-density target substance in the outer peripheral portion DTo, and the outer peripheral portion DTo of the diffusion target DT can be turned into plasma more efficiently. However, in the present disclosure, the diffusion target DT may be irradiated with the second main pulse laser light MPL2 and the first main pulse laser light MPL1 in the order thereof.

Further, according to the EUV light generation apparatus 100 and the EUV light generation method of the present embodiment, the first main pulse laser light MPL1 and the second main pulse laser light MPL2 have the same wavelength. Therefore, the first main pulse laser light MPL1 and the second main pulse laser light MPL2 can be set to a wavelength to be easily absorbed by the diffusion target DT. However, in the present disclosure, the first main pulse laser light MPL1 and the second main pulse laser light MPL2 may have different wavelengths from each other. In this case, it is preferable that the first main pulse laser light MPL1 mainly radiated to the portion of the diffusion target DT where the density of the target substance is low is $CO_2$ laser light, and the second main pulse laser light MPL2 mainly radiated to the portion of the diffusion target DT where the density of the target substance is high is YAG laser light. Further, in this case, a dichroic mirror that transmits the first main pulse laser light MPL1 and reflects the second main pulse laser light MPL2 may be used in place of the polarizer 36. When the dichroic mirror is used, the polarization directions of the first main pulse laser light MPL1 and the second main pulse laser light MPL2 may be the same or different.

5. Description of Extreme Ultraviolet Light Generation Apparatus of Second Embodiment Next, the configuration of the EUV light generation apparatus 100 of a second embodiment will be described. Any component same as that described above is denoted by an identical reference sign, and duplicate description thereof is omitted unless specific description is needed.

5.1 Configuration

Figure 12:
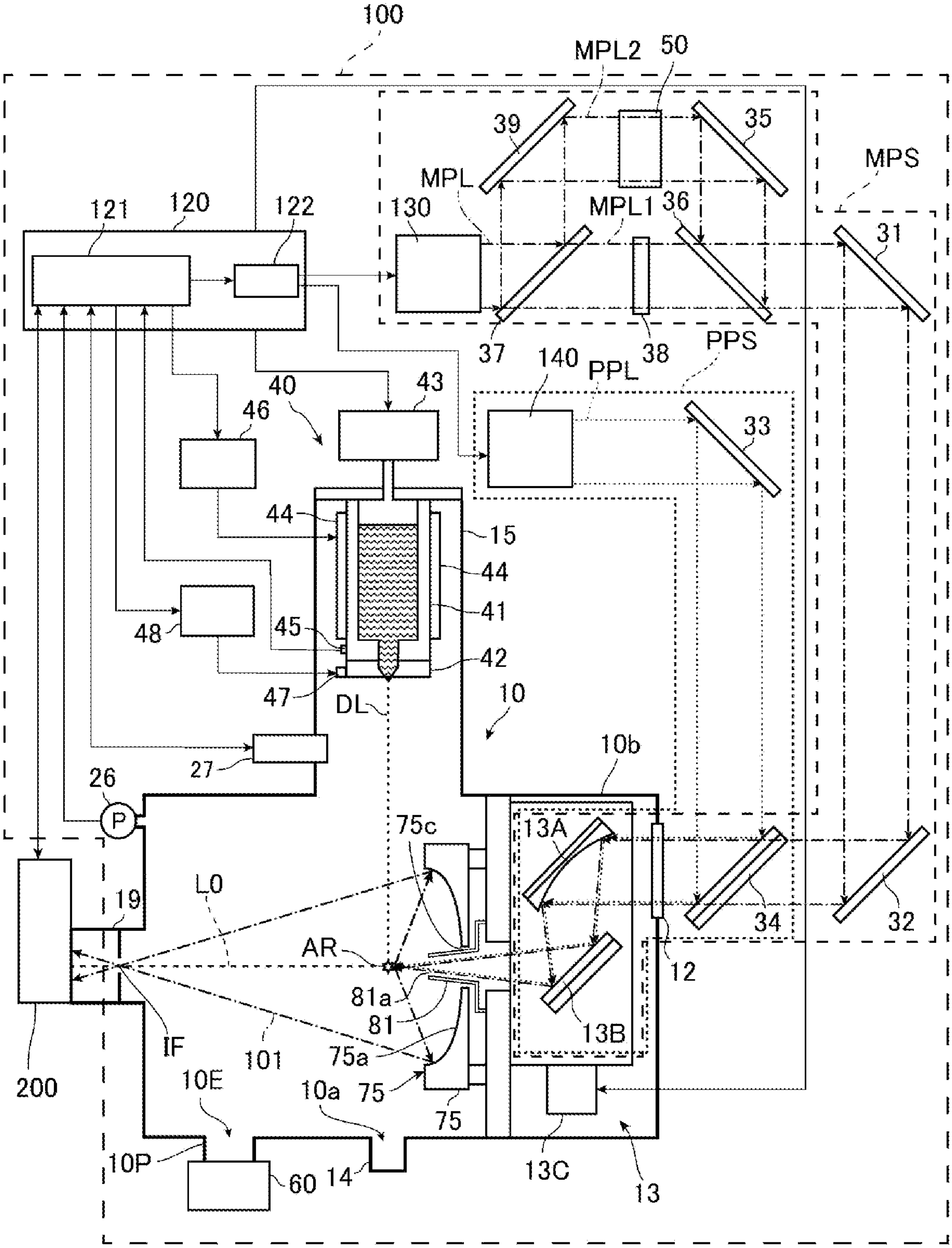
FIG. 12 is a schematic view showing a schematic configuration example of the entire extreme ultraviolet light generation apparatus of a second embodiment.

FIG. 12 is a schematic view showing a schematic configuration example of the entire EUV light generation apparatus 100 of the present embodiment. As shown in FIG. 12, in the EUV light generation apparatus 100 of the present embodiment, the configuration of the main pulse laser light irradiation system MPS is different from the configuration of the main pulse laser light irradiation system MPS of the comparative example. In the first embodiment, the main pulse laser light irradiation system MPS includes the first and second main pulse laser devices 131, 132. However, in the present embodiment, the main pulse laser light irradiation system MPS includes the main pulse laser device 130 as in the comparative example. Further, the main pulse laser light irradiation system MPS of the present embodiment is different from the main pulse laser light irradiation system MPS of the first embodiment in further including a beam splitter 37, a λ/2 wavelength plate 38, and a mirror 39.

The main pulse laser light MPL is output from the main pulse laser device 130. The main pulse laser light MPL has a Gaussian-type energy density distribution. In the present embodiment, the polarization direction of the main pulse laser light MPL output from the main pulse laser device 130 and the polarization direction of light to be transmitted by the polarizer 36 with high transmittance are different from each other by 90°.

The beam splitter 37 is arranged at a position on which the main pulse laser light MPL output from the main pulse laser device 130 is incident. The beam splitter 37 transmits a part of the main pulse laser light MPL as the first main pulse laser light MPL1, and reflects another part of the main pulse laser light MPL as the second main pulse laser light MPL2.

The λ/2 wavelength plate 38 is arranged at a position on which the first main pulse laser light MPL1 transmitted through the beam splitter 37 is incident. Therefore, the first main pulse laser light MPL1 passes through the λ/2 wavelength plate 38, and the polarization direction thereof is changed by 90°. Therefore, the polarization direction of the first main pulse laser light MPL1 transmitted through the λ/2 wavelength plate 38 coincides with the polarization direction of the laser light transmitted through the polarizer 36.

The mirror 39 is arranged at a position on which the second main pulse laser light MPL2 reflected by the beam splitter 37 is incident. The mirror 39 reflects the second main pulse laser light MPL2 toward the beam adjustment optical system 50. Therefore, as in the first embodiment, the second main pulse laser light MPL2 is converted into laser light having a higher energy density at the outer peripheral portion than at the central portion, and is reflected by the mirror 35 and the polarizer 36.

In the main pulse laser light irradiation system MPS of the present embodiment, the optical path of the second main pulse laser light MPL2 is configured to be longer than the optical path of the first main pulse laser light MPL1. Therefore, in the present embodiment, the beam splitter 37, the mirror 39, the λ/2 wavelength plate 38, the beam adjustment optical system 50, the mirror 35, and the polarizer 36 constitute an optical delay circuit which delays the second main pulse laser light MPL2 by a predetermined time with respect to the first main pulse laser light MPL1. The difference between the optical paths of the second main pulse laser light MPL2 and the first main pulse laser light MPL1 is, for example, 0.3 m or more and 3 m or less. With such an optical path difference, the second main pulse laser light MPL2 is incident on the plasma generation region AR as being delayed from the first main pulse laser light MPL1 by a time difference equal to or larger than 1 ns and equal to or smaller than 10 ns.

5.2 Operation

Next, operation of the EUV light generation apparatus 100 of the present embodiment will be described. In the present embodiment as well, similarly to the first embodiment, the flowchart showing the operation of the EUV light generation apparatus 100 is similar to the flowchart showing the operation of the EUV light generation apparatus 100 of the comparative example shown in FIG. 4. However, in the present embodiment, the main pulse laser light irradiation step SP3 is different from that in each of the comparative example and the first embodiment. Also in the present embodiment, since the target supply step SP1 and the prepulse laser light irradiation step SP2 are similar to those in the comparative example, the main pulse laser light irradiation step SP3 will be described.

(Main Pulse Laser Light Irradiation Step SP3)

Similarly to the first embodiment, this step in the present embodiment is a step of irradiating the diffusion target DT with the first main pulse laser light MPL1 and the second main pulse laser light MPL2. In the present embodiment, after the prepulse laser light PPL is output from the prepulse laser device 140, the main pulse laser device 130 outputs the main pulse laser light MPL. The main pulse laser light MPL is incident on the beam splitter 37, and a part of the main pulse laser light MPL transmits through the beam splitter 37 as the first main pulse laser light MPL1. The first main pulse laser light MPL1 transmitted through the beam splitter 37 is transmitted through the λ/2 wavelength plate 38 and the polarizer 36, and reaches the plasma generation region AR to be radiated to the diffusion target DT in the same manner as the first main pulse laser light MPL1 of the first embodiment. The energy density distribution and fluence of the first main pulse laser light MPL1 in this embodiment are the same as those in the first embodiment. Therefore, the diffusion target DT irradiated with the first main pulse laser light MPL1 is turned into plasma in the same manner as in the first embodiment.

The timing at which the diffusion target DT is irradiated with the first main pulse laser light MPL1 is similar to that in the first embodiment. Accordingly, the processor 121 and the delay circuit 122 output the light emission trigger signal to the main pulse laser device 130 so that the first main pulse laser light MPL1 is radiated to the diffusion target DT at such time interval.

Further, another part of the main pulse laser light MPL output from the main pulse laser device 130 is reflected by the beam splitter 37 as the second main pulse laser light MPL2. The second main pulse laser light MPL2 reflected by the beam splitter 37 is reflected by the mirror 39, and is converted by the beam adjustment optical system 50 into laser light having a higher energy density at the outer peripheral portion than at the central portion. The second main pulse laser light MPL2 having the converted energy density distribution is reflected by the mirror 35 and the polarizer 36, and reaches the plasma generation region AR to be radiated to the diffusion target DT in the same manner as the second main pulse laser light MPL2 of the first embodiment. At this time, a time difference between the timing at which the diffusion target DT is irradiated with the first main pulse laser light MPL1 and the timing at which the diffusion target DT is irradiated with the second main pulse laser light MPL2 is 1 ns or more and 10 ns or less. The energy density distribution and fluence of the second main pulse laser light MPL2 in this embodiment are the same as those in the first embodiment. Therefore, the diffusion target DT irradiated with the second main pulse laser light MPL2 is turned into plasma in the same manner as in the first embodiment.

The timing at which the diffusion target DT is irradiated with the second main pulse laser light MPL2 is similar to that in the first embodiment. Thus, in the optical delay circuit, the optical path difference between the first main pulse laser light MPL1 and the second main pulse laser light MPL2 is set so that the second main pulse laser light MPL2 is radiated to the diffusion target DT as described above.

5.3 Effects

In the EUV light generation apparatus 100 and the EUV light generation method according to the present embodiment, the Gaussian-type laser light output from the single main pulse laser device 130 is split into two streams of laser light, while one thereof is used as the first main pulse laser light MPL1 and the other thereof is converted into the second main pulse laser light MPL2 to be delayed.

According to the EUV light generation apparatus 100 and the EUV light generation method described above, it is not necessary to use a plurality of main pulse laser devices, and thus the cost can be reduced.

Further, according to the EUV light generation apparatus 100 and the EUV light generation method of the present embodiment, the first main pulse laser light MPL1 and the second main pulse laser light MPL2 have the same wavelength. Therefore, the first main pulse laser light MPL1 and the second main pulse laser light MPL2 can be set to a wavelength to be easily absorbed by the diffusion target DT.

Here, in the EUV light generation apparatus 100 of the present embodiment, the λ/2 wavelength plate 38 is arranged on the optical path on which the first main pulse laser light MPL1 propagates and the second main pulse laser light MPL2 does not propagate. However, the λ/2 wavelength plate 38 may be arranged on the optical path on which the second main pulse laser light MPL2 propagates and the first main pulse laser light MPL1 does not propagate. In this case, the polarizer 36 is arranged such that the polarization direction thereof coincides with the polarization direction of the main pulse laser light MPL output from the main pulse laser device 130.

Further, in the description of the EUV light generation apparatus 100 and the EUV light generation method of the present embodiment, the first main pulse laser light MPL1 and the second main pulse laser light MPL2 are radiated to the diffusion target DT at different timings. However, in the present disclosure, the first main pulse laser light MPL1 and the second main pulse laser light MPL2 may be radiated to the diffusion target DT at the same time. In this case, the length of the optical path on which the first main pulse laser light MPL1 propagates and the length of the optical path on which the second main pulse laser light MPL2 may be set to be the same.

Further, in the description of the EUV light generation apparatus 100 and the EUV light generation method of the present embodiment, the first main pulse laser light MPL1 and the second main pulse laser light MPL2 are radiated to the diffusion target DT in the order thereof. However, in the present disclosure, the diffusion target DT may be irradiated with the second main pulse laser light MPL2 and the first main pulse laser light MPL1 in the order thereof. In this case, an optical delay circuit may be arranged on the optical path on which the first main pulse laser light MPL1 propagates and the second main pulse laser light MPL2 does not propagate so as to achieve such a timing.

The description above is intended to be illustrative and the present disclosure is not limited thereto. Therefore, it would be obvious to those skilled in the art that various modifications to the embodiments of the present disclosure would be possible without departing from the spirit and the scope of the appended claims. Further, it would be also obvious to those skilled in the art that embodiments of the present disclosure would be appropriately combined.

The terms used throughout the present specification and the appended claims should be interpreted as non-limiting terms unless clearly described. For example, terms such as "comprise", "include", "have", and "contain" should not be interpreted to be exclusive of other structural elements. Further, indefinite articles "a/an" described in the present specification and the appended claims should be interpreted to mean "at least one" or "one or more." Further, "at least one of A, B, and C" should be interpreted to mean any of A, B, C, A+B, A+C, B+C, and A+B+C as well as to include combinations of the any thereof and any other than A, B, and C.

What is claimed is:

1. An extreme ultraviolet light generation method, comprising:
- a target supply step of outputting a droplet target into a chamber;
- a prepulse laser light irradiation step of irradiating the droplet target with prepulse laser light to generate a diffusion target; and
- a main pulse laser light irradiation step of irradiating the diffusion target with main pulse laser light to generate extreme ultraviolet light,
- the main pulse laser light including first main pulse laser light and second main pulse laser light, and
- in the main pulse laser light irradiation step, the diffusion target being irradiated with the first main pulse laser light having higher energy density at a central portion than at an outer peripheral portion and the second main pulse laser light having higher energy density at the outer peripheral portion than at the central portion.

2. The extreme ultraviolet light generation method according to claim 1,
- wherein the first main pulse laser light and the second main pulse laser light are radiated to the diffusion target at different timings.

3. The extreme ultraviolet light generation method according to claim 2,
- wherein the first main pulse laser light and the second main pulse laser light are radiated to the diffusion target in the order thereof.

4. The extreme ultraviolet light generation method according to claim 2,
- wherein a time difference between a timing at which the diffusion target is irradiated with the first main pulse laser light and a timing at which the diffusion target is irradiated with the second main pulse laser light is 1 ns or more and 10 ns or less.

5. The extreme ultraviolet light generation method according to claim 2,
- wherein the first main pulse laser light and the second main pulse laser light have the same wavelength.

6. The extreme ultraviolet light generation method according to claim 5,
- wherein Gaussian-type laser light output from a single laser device is split into two streams of laser light, while one thereof is used as the first main pulse laser light and the other thereof is converted into the second main pulse laser light to cause the one or the other thereof to be delayed.

7. The extreme ultraviolet light generation method according to claim 1,
- wherein fluence of the second main pulse laser light is higher than fluence of the first main pulse laser light.

8. The extreme ultraviolet light generation method according to claim 1, wherein the second main pulse laser light is annular laser light, and an outer diameter of the first main pulse laser light is equal to or larger than an inner diameter of the second main pulse laser light.

9. The extreme ultraviolet light generation method according to claim 1, wherein the first main pulse laser light and the second main pulse laser light have different wavelengths from each other.

10. The extreme ultraviolet light generation method according to claim 9, wherein the first main pulse laser light is $CO_2$ laser light and the second main pulse laser light is YAG laser light.

11. An extreme ultraviolet light generation apparatus, comprising:

a target supply unit configured to output a droplet target into a chamber;

a prepulse laser light irradiation system configured to irradiate the droplet target with prepulse laser light to generate a diffusion target; and a main pulse laser light irradiation system configured to irradiate the diffusion target with main pulse laser light to generate extreme ultraviolet light, the main pulse laser light including first main pulse laser light and second main pulse laser light, and the main pulse laser light irradiation system being configured to irradiate the diffusion target with the first main pulse laser light having higher energy density at a central portion than at an outer peripheral portion and the second main pulse laser light having higher energy density at the outer peripheral portion than at the central portion.

12. The extreme ultraviolet light generation apparatus according to claim 11, wherein the main pulse laser light irradiation system radiates the first main pulse laser light and the second main pulse laser light to the diffusion target at different timings.

13. The extreme ultraviolet light generation apparatus according to claim 12, wherein the main pulse laser light irradiation system radiates the first main pulse laser light and the second main pulse laser light to the diffusion target in the order thereof.

14. The extreme ultraviolet light generation apparatus according to claim 12, wherein a time difference between a timing at which the diffusion target is irradiated with the first main pulse laser light and that with the second main pulse laser light is 1 ns or more and 10 ns or less.

15. The extreme ultraviolet light generation apparatus according to claim 12, wherein the first main pulse laser light and the second main pulse laser light have the same wavelength.

16. The extreme ultraviolet light generation apparatus according to claim 15, wherein the main pulse laser light irradiation system includes a laser device, a beam splitter configured to split Gaussian-type laser light output from the laser device into two streams of laser light while one thereof being the first main pulse laser light, a beam adjustment optical system configured to convert the other laser light split by the beam splitter into the second main pulse laser light, and a delay circuit configured to cause the one laser light or the other laser light to be delayed.

17. The extreme ultraviolet light generation apparatus according to claim 11, wherein fluence of the second main pulse laser light is higher than fluence of the first main pulse laser light.

18. The extreme ultraviolet light generation apparatus according to claim 11, wherein the second main pulse laser light is annular laser light, and an outer diameter of the first main pulse laser light is equal to or larger than an inner diameter of the second main pulse laser light.

19. An electronic device manufacturing method, comprising:

outputting extreme ultraviolet light generated with an extreme ultraviolet light generation method to an exposure apparatus; and exposing a photosensitive substrate to the extreme ultraviolet light in the exposure apparatus to manufacture an electronic device, the extreme ultraviolet light generation method including:

a target supply step of outputting a droplet target into a chamber;

a prepulse laser light irradiation step of irradiating the droplet target with prepulse laser light to generate a diffusion target; and a main pulse laser light irradiation step of irradiating the diffusion target with main pulse laser light to generate the extreme ultraviolet light;

the main pulse laser light including first main pulse laser light and second main pulse laser light, and in the main pulse laser light irradiation step, the diffusion target being irradiated with the first main pulse laser light having higher energy density at a central portion than at an outer peripheral portion and the second main pulse laser light having higher energy density at the outer peripheral portion than at the central portion.

20. An electronic device manufacturing method, comprising:

inspecting a defect of a mask by irradiating the mask with extreme ultraviolet light generated with an extreme ultraviolet light generation method;

selecting a mask using a result of the inspection; and exposing and transferring a pattern formed on the selected mask onto a photosensitive substrate, the extreme ultraviolet light generation method including:

a target supply step of outputting a droplet target into a chamber;

a prepulse laser light irradiation step of irradiating the droplet target with prepulse laser light to generate a diffusion target; and a main pulse laser light irradiation step of irradiating the diffusion target with main pulse laser light to the generate extreme ultraviolet light, the main pulse laser light including first main pulse laser light and second main pulse laser light, and in the main pulse laser light irradiation step, the diffusion target being irradiated with the first main pulse laser light having higher energy density at a central portion than at an outer peripheral portion and the second main pulse laser light having higher energy density at the outer peripheral portion than at the central portion.

* * * * *